US008813322B2

(12) United States Patent
Novara

(10) Patent No.: US 8,813,322 B2
(45) Date of Patent: Aug. 26, 2014

(54) BUCKLE FOR RESTRAINT SYSTEMS FOR CAR SAFETY SEATS FOR CHILDREN, PROVIDED WITH A DEVICE FOR INDICATING THE CORRECT TENSIONING

(75) Inventor: Paolo Novara, Grugliasco (IT)

(73) Assignee: Novarace S.r.l., Turin (IT)

( * ) Notice: Subject to any disclaimer, the term of this patent is extended or adjusted under 35 U.S.C. 154(b) by 53 days.

(21) Appl. No.: 13/232,574

(22) Filed: Sep. 14, 2011

(65) Prior Publication Data

US 2012/0110800 A1 May 10, 2012

(30) Foreign Application Priority Data

Sep. 16, 2010 (IT) ................ TO2010A0760

(51) Int. Cl.
*A44B 11/25* (2006.01)
*B60R 22/10* (2006.01)
*B60R 22/48* (2006.01)

(52) U.S. Cl.
CPC ......... *B60R 22/48* (2013.01); *B60R 2022/4841* (2013.01); *A44B 11/2569* (2013.01)
USPC ............... 24/632; 24/579.11; 24/633; 24/641

(58) Field of Classification Search
CPC ........... A44B 11/2569; A44B 11/2549; B60R 22/48; B60R 2022/4841
USPC ............................. 24/579.11, 633, 641, 632
See application file for complete search history.

(56) References Cited

U.S. PATENT DOCUMENTS

| 3,825,979 | A | * | 7/1974 | Jakob .................. 24/579.11 |
| 5,023,981 | A | * | 6/1991 | Anthony et al. ........... 24/579.11 |
| 5,038,446 | A | * | 8/1991 | Anthony et al. ........... 24/579.11 |
| 5,142,748 | A | * | 9/1992 | Anthony et al. ........... 24/579.11 |
| 5,584,107 | A | * | 12/1996 | Koyanagi et al. ............ 24/632 |
| 5,606,783 | A | * | 3/1997 | Gillis et al. ................ 24/632 |
| 6,922,875 | B2 | * | 8/2005 | Sato et al. .................. 24/579.11 |
| 7,426,771 | B2 | * | 9/2008 | Patrizi et al. .................... 24/307 |
| 7,992,269 | B2 | * | 8/2011 | Patrizi et al. .................... 24/633 |
| 2004/0154145 | A1 | * | 8/2004 | Sato et al. .................. 24/579.11 |
| 2009/0038125 | A1 | * | 2/2009 | Wu .................. 24/633 |
| 2011/0107560 | A1 | * | 5/2011 | Buckingham et al. ......... 24/166 |
| 2011/0247180 | A1 | * | 10/2011 | Duong et al. .................. 24/164 |

OTHER PUBLICATIONS

European Search Report for corresponding European Patent Application No. 11181267 mailed Sep. 27, 2011.

* cited by examiner

*Primary Examiner* — Robert J Sandy
*Assistant Examiner* — Louis Mercado
(74) *Attorney, Agent, or Firm* — Merchant & Gould P.C.

(57) ABSTRACT

A buckle includes a case connected to a restraint system lower belt. A coupling mechanism releasably engages tongue-like coupling elements connected to respective upper belts. An indicator indicates correct belt tensioning and has a visual symbol visible through openings in the case. The indicator moves in the case between a first position in which the visual symbol is not visible, for loose belts, and a second position in which the visual symbol is visible, for correctly tensioned belts. First springs urge the indicator towards the first position. A locking element in the case connects to an end of the lower belt. Second springs between the case and the locking element are resiliently deformed from tension on the lower belt. The locking element cooperates with the indicator so that when the indicator is in the second position, it is locked.

6 Claims, 4 Drawing Sheets

BUCKLE FOR RESTRAINT SYSTEMS FOR CAR SAFETY SEATS FOR CHILDREN, PROVIDED WITH A DEVICE FOR INDICATING THE CORRECT TENSIONING

This application claims benefit of Serial No. TO2010A000760, filed 16 Sep. 2010 in Italy and which application is incorporated herein by reference. To the extent appropriate, a claim of priority is made to the above disclosed application.

BACKGROUND OF THE INVENTION

The present invention refers in general to a restraint system for car safety seats for children, the restraint system being indifferently of the type with three or five mounting points and comprising three belts, namely a lower belt and two upper belts, which can be releasably connected to each other by means of a fastening device comprising a buckle and two tongue-like coupling elements, the buckle comprising a case attached to the free end (upper end) of the lower belt and a coupling mechanism arranged to releasably (to this end, the coupling mechanism comprises a release button operable by the user) engage the two tongue-like coupling elements, each of which is connected to a respective upper belt, when both the tongue-like coupling elements are inserted into the case of the buckle. More specifically, the present invention refers to a device for indicating the correct tensioning intended for a restraint system of the above-identified type.

Once the three belts have been connected to each other by means of the fastening device, in order to ensure that the body of the child sitting in the seat is safely restrained, it is necessary to tension the belts with a given minimum tension level. In order to allow the user to realize when the correct tension level in the belts has been reached, it is known the use of indicator devices which provide a visual indication of the condition of correct tensioning of the belts. These known indicator devices typically comprise one or more springs through which the lower belt is connected to the case of the buckle, in such a manner that the spring(s) is(are) elastically deformed depending on the tension force acting on the lower belt and therefore cause a relative movement between the lower belt and the case of the buckle, and an indicator element (separate from the release button) having a visual symbol, such as for instance a red- or green-coloured rectangle, which in the condition of correct tensioning of the belts can be seen by the user through a special window provided in the case of the buckle to give a visual indication that the condition of correct tensioning has been reached, wherein the indicator element is mounted in the case of the buckle so as to move, as a result of the relative movement between the lower belt and the case of the buckle, between a first end-of-travel position, corresponding to the condition of loose belts, in which the visual symbol on the indicator element is not visible through the window provided in the case of the buckle, and a second end-of-travel position, corresponding to the condition of correct tensioning of the belts, in which the visual symbol on the indicator element is wholly visible through the window provided in the case of the buckle. The spring (or the springs) and the indicator element are designed in such a manner that the indicator element takes the aforesaid second end-of-travel position when the tension force applied on the lower belt has reached the desired value. The user which fastens the belts knows then that he shall tighten the belts on the body of the child until the visual symbol on the indicator element in the buckle is visible through the respective window. The main problem of such a known indicator device is that once the belts have been correctly tensioned, the indicator element does not permanently remain in the aforesaid second end-of-travel position in which it indicates the condition of correct tensioning, but it may move towards the first end-of-travel position due to relative movements between the lower belt and the case of the buckle. The user who, after having correctly fastened the belts, notices a change in the indication provided by the indicator device may therefore be confused by that and led to tension the belts again, even if not necessary.

SUMMARY OF THE INVENTION

It is therefore an object of the present invention to provide a buckle for restraint systems for car safety seats for children provided with a device for indicating the correct tensioning, which allows to overcome the above-discussed drawback of the prior art.

This and other objects are fully achieved according to the present invention by virtue of a buckle for restraint systems for car safety seats for children.

BRIEF DESCRIPTION OF THE DRAWINGS

The features and the advantages of the present invention will become clear from the following detailed description, given purely by way of non-limiting example with reference to the appended drawings, in which.

DETAILED DESCRIPTION OF THE PREFERRED EMBODIMENTS

Figure 1:
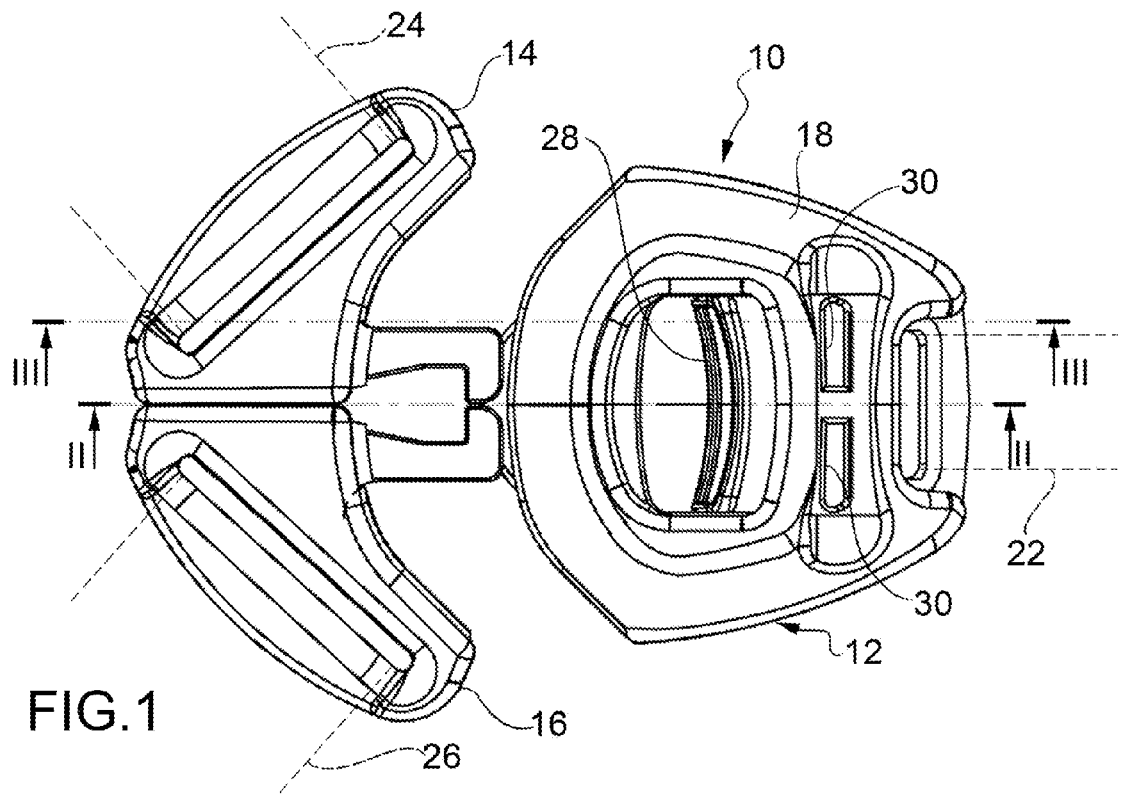
FIG. 1 is a plan view from above of a fastening device for restraint systems for car safety seats for children having a buckle provided with a device for indicating the correct tensioning according to the present invention, in the condition in which the buckle is open.
Figure 2:
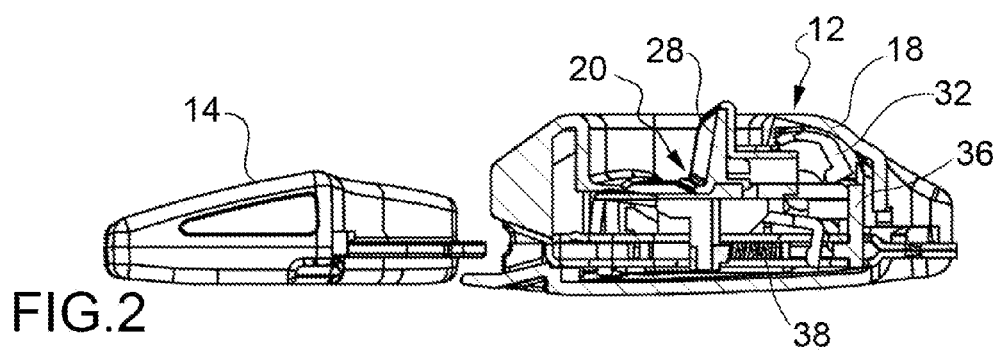
FIGS. 2 and 3 are section views of the fastening device of FIG. 1, taken along to the section lines II-II and III-III of FIG. 1, respectively.
Figure 3:
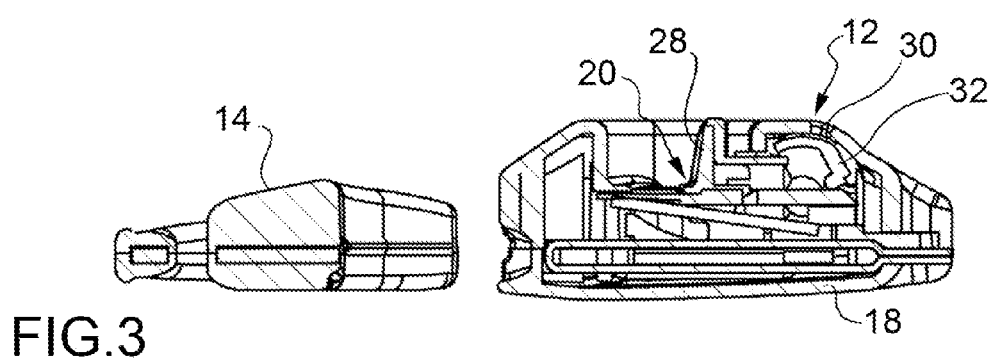
Figure 4:
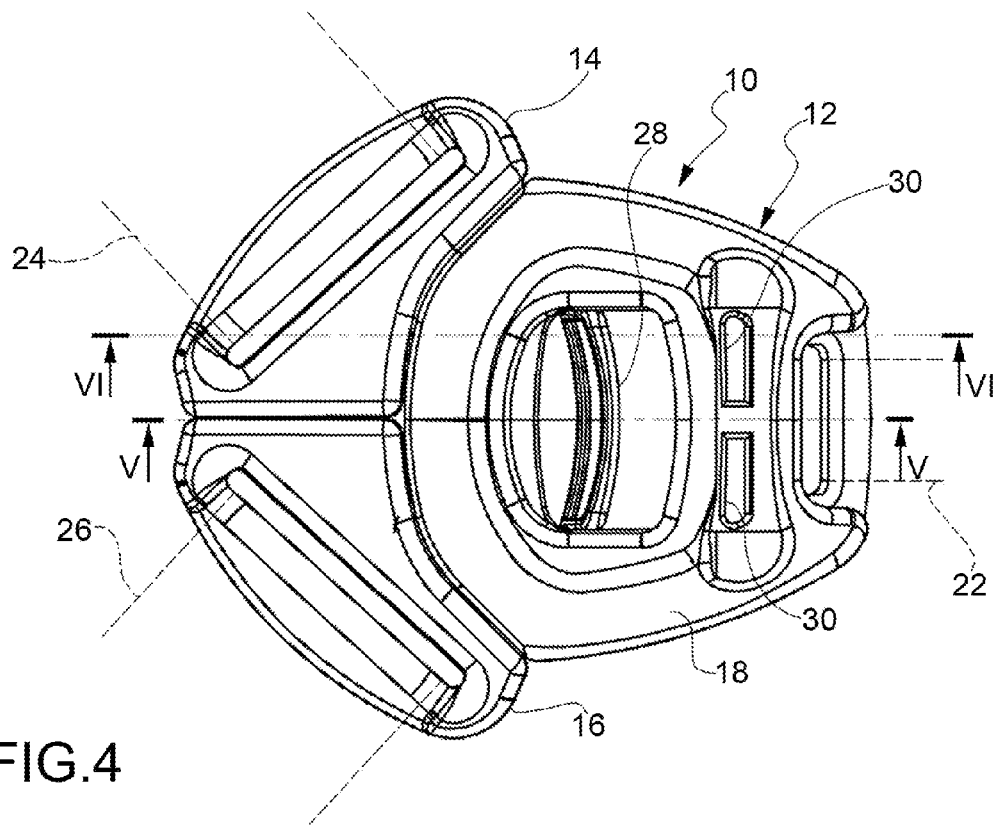
FIG. 4 is a plan view from above which is similar to the one of FIG. 1, but which relates to the condition in which the buckle is closed and the lower belt is loose.
Figure 5:
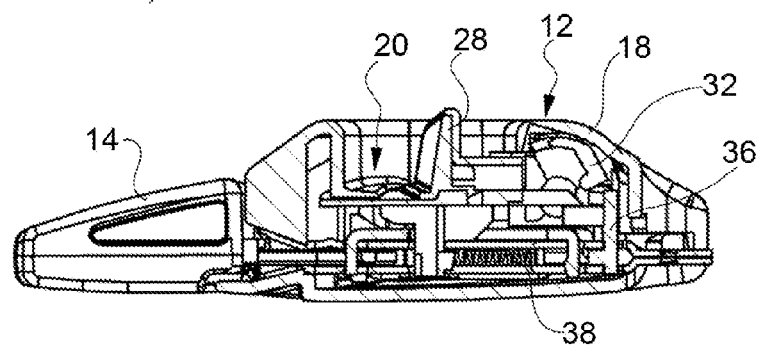
FIGS. 5 and 6 are section views of the fastening device of FIG. 4, taken along the section lines V-V and VI-VI of FIG. 4, respectively.
Figure 6:
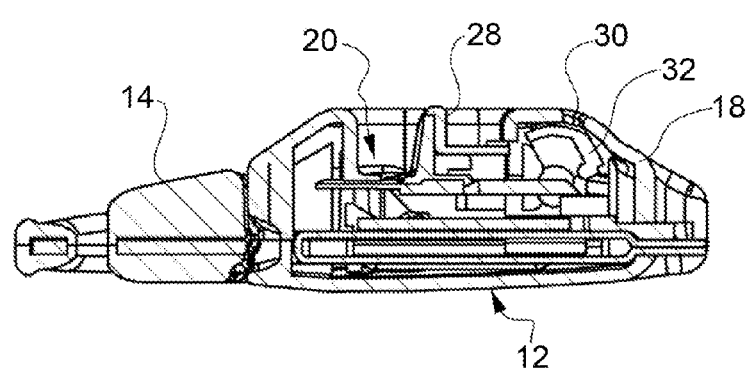

In the drawings, a coupling device for restraint systems for car safety seats for children is generally indicated 10 and comprises a buckle 12 and a pair of tongue-like coupling elements 14 and 16 arranged to be releasably engaged by the buckle 12. The buckle 12 comprises a case 18 and a coupling mechanism 20 arranged to releasably engage the two tongue-like coupling elements 14 and 16 when these latter are inserted into the case 18. The case 18 is attached to the free end of a lower belt 22 of the restraint system, whereas the tongue-like coupling elements 14 and 16 are connected to an upper belt 24 and to an upper belt 26 of the restraint system, respectively. The lower belt 22 and the two upper belts 24 and 26 of the restraint system are partially shown in FIGS. 1, 4 and 7, where they are depicted in broken line.

The coupling mechanism 20 of the buckle 12 and the tongue-like coupling elements 14 and 16 will not be described in detail herein as they do not require special structural features in order to implement the present invention and can therefore be of known type. What is to be highlighted for the purposes of the present invention is only that the coupling mechanism 20 comprises a release button 28 which is received in the case 18 of the buckle 12 so as to be able to slide in the direction of insertion of the tongue-like coupling elements 14 and 16 (direction coinciding with the section line II-II of FIG. 1, with the section line V-V of FIG. 4 and with the section line VIII-VIII of FIG. 7), hereinafter simply referred to as longitudinal direction. As far as the case 18 of the buckle 12 is concerned, what is important for the purposes of the present invention is that it has at least one opening or window 30 (in the illustrated example, two openings or windows of generally rectangular shape) through which the information that the condition of correct tensioning of the belts has been reached is displayed, as will be better explained further on.

Figure 7:
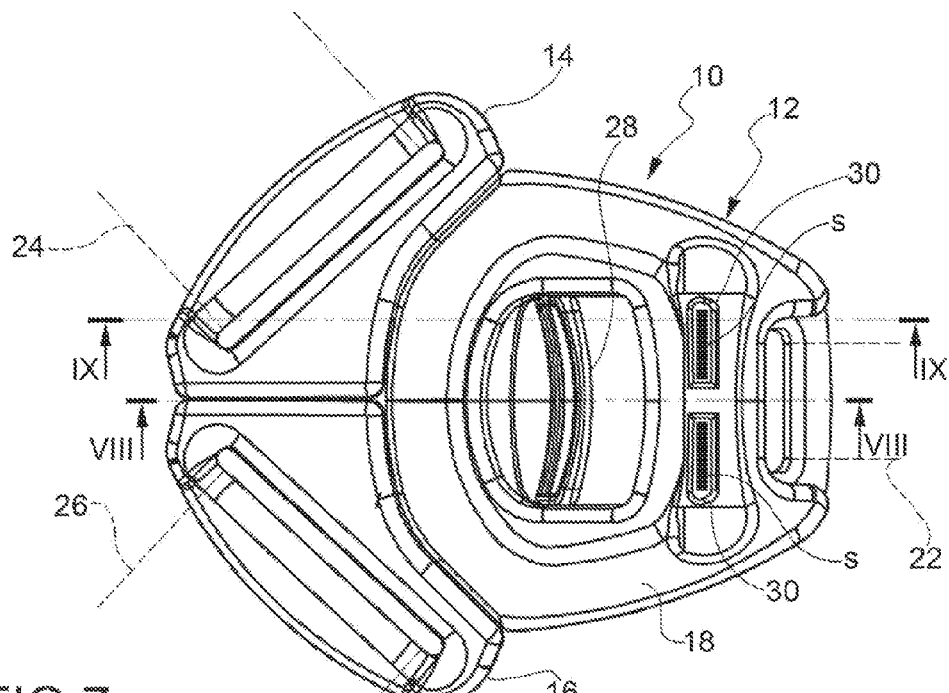
FIG. 7 is a plan view from above which is similar to the one of FIG. 1, but which relates to the condition in which the buckle is closed and the lower belt is tensioned.
Figure 8:
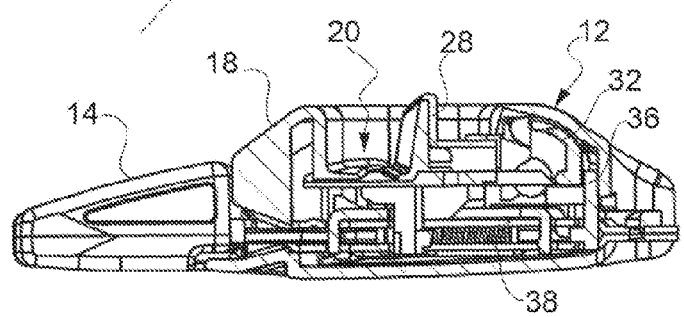
FIGS. 8 and 9 are section views of the fastening device of FIG. 7, taken along the section lines VIII-VIII and IX-IX of FIG. 7, respectively.
Figure 9:
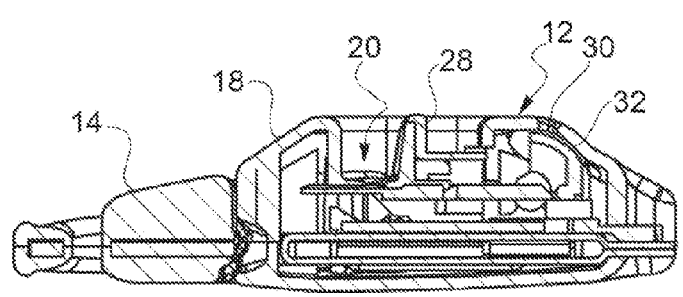
Figure 10:
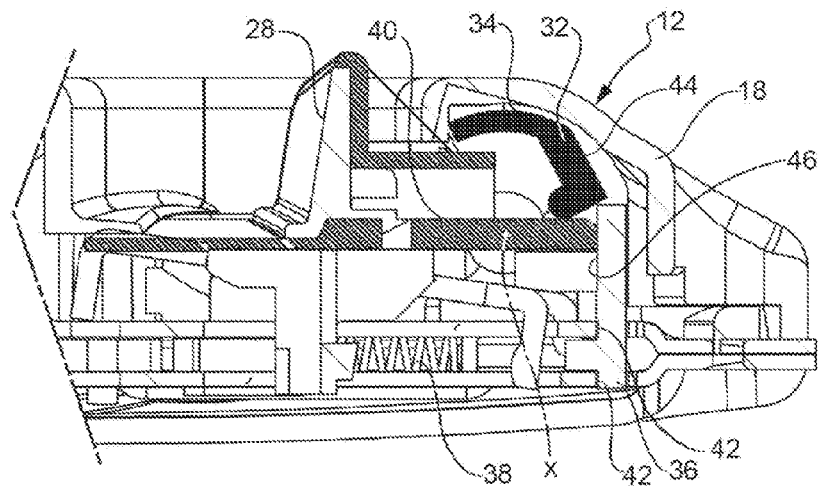
FIG. 10 is a section view on an enlarged scale of the buckle according to the present invention, which shows in detail the device for indicating the correct tensioning in the condition in which the buckle is open.
Figure 11:
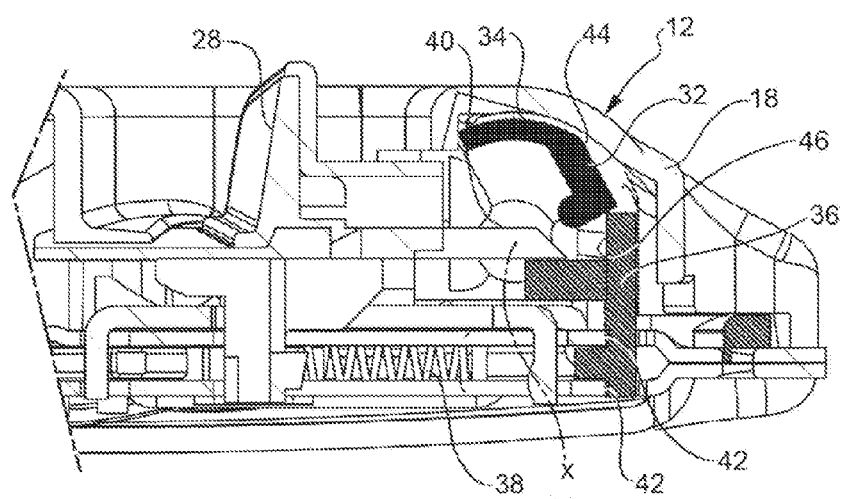
FIG. 11 is a section view on an enlarged scale of the buckle according to the present invention, which shows in detail the device for indicating the correct tensioning in the condition in which the buckle is closed and the lower belt is loose.
Figure 12:
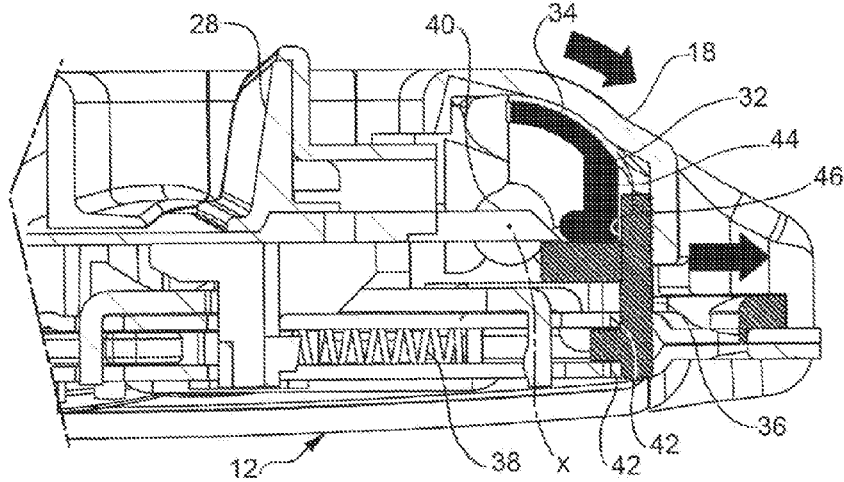
FIG. 12 is a section view on an enlarged scale of the buckle according to the present invention, which shows in detail the device for indicating the correct tensioning in the condition in which the buckle is closed and the lower belt is tensioned.

With reference in particular to FIGS. 10 to 12, the case 18 of the buckle 12 also accommodates an indicator element 32 having a convex surface 34 which faces towards the outside of the buckle and on which a visual symbol S shown in FIG. 7 is represented, which visual symbol will advantageously consist in the present case of a pair of coloured rectangles (for instance red- or green-coloured), which are sized and positioned so as to be simultaneously visible through the two openings 30 provided in the case 18. The indicator element 32 is supported for rotation by the case 18 about an axis of rotation x perpendicular to the aforesaid longitudinal direction (i.e. perpendicular to the plane of the sheet in the attached drawings), so as to be able to rotate between a first end-of-travel position (FIGS. 10 and 11), corresponding to the condition in which the belts are loose, in which the rectangles depicted on the surface 34 of the indicator element 32 are not visible through the two openings 30 provided in the case 18, and a second end-of-travel position (FIG. 12), corresponding to the condition in which the belts are correctly tensioned, in which the rectangles depicted on the surface 34 of the indicator element 32 are on the contrary visible through the two openings 30 provided in the case 18, thereby indicating to the user that the correct tension in the belts has been reached. One or more first resilient elements (not shown) are received in the case 18 of the buckle 12 and are arranged to apply on the indicator element 32 a resilient force tending to urge that element to the aforesaid second end-of-travel position (i.e. to cause it to rotate clockwise relative to the point of view of the observer of FIGS. 10 to 12). The case 18 of the buckle 12 also accommodates, on the side facing towards the attachment point of the lower belt 22, a locking element 36 which in use is fixed (directly or indirectly, i.e. via further elements disposed in between) to an end of the lower belt 22 and is slidably mounted in the longitudinal direction of the buckle. The case 18 of the buckle 12 also accommodates one or more second resilient elements 38 (preferably two elements—one for each side of the case of the buckle—and preferably made as cylindrical helical springs) arranged to apply on the locking element 36 a longitudinal resilient force tending to pull the locking element towards the inside of the case of the buckle.

When the buckle 12 is open, i.e. when the tongue-like coupling elements 14 and 16 are not engaged by the case 18 of the buckle, as shown in FIG. 10, the indicator element 32 is kept locked in the first end-of-travel position, and cannot therefore rotate towards the second end-of-travel position, by virtue of the fact that it abuts against the upper flat face of a plate 40 which is drivingly connected for longitudinal translation with the release button 28. Accordingly, the indicator element 32 permanently indicates to the user the condition of non-correct tensioning of the belts.

When the buckle 12 is closed, i.e. when the tongue-like coupling elements 14 and 16 are engaged by the case 18 of the buckle, the release button 28, along with the plate 40, moves towards the tongue-like coupling elements, thereby disengaging the indicator element 32, as shown in FIGS. 11 and 12. In this condition, should the lower belt 22 become loose, as shown in FIG. 11, the locking element 36 would be kept by the second resilient elements 38 in abutment against one or more first abutment surfaces 42 (in the illustrated example, a pair of first abutment surfaces). In this position, the locking element 36 abuts (in particular with an upper edge thereof which is perpendicular to the longitudinal direction of the buckle and facing towards the inside of the case of the buckle) against the indicator element 32 keeping it locked in the first end-of-travel position and preventing therefore it from rotating towards the second end-of-travel position. The indicator element 32 continues therefore to indicate permanently to the user the condition of non-correct tensioning of the belts. When the lower belt 22 is tensioned, it pulls the locking element 36 with itself against the resilient biasing force of the second resilient elements 38, thereby moving this element away from the axis of rotation of the indicator element 32. The indicator element 32, the locking element 36 and the second resilient elements 38 are configured in such a manner that once the correct tension in the lower belt 22 is reached the aforesaid upper edge of the locking element 36 disengages from the indicator element 32, thereby allowing it to rotate into the second end-of-travel position, in which is indicates to the user that the belts are correctly tensioned. This condition is shown in FIG. 12. As clearly results from this Figure, when the indicator element 32 reaches the second end-of-travel position it remains locked in this position by virtue of the fact that a flat abutment surface 44 of the locking element 36 come into abutment against a corresponding flat abutment surface 46 of the indicator element 32 and is kept in this position as a result of the resilient biasing force applied on the locking element 36 by the second resilient elements 38. A possible loosening of the lower belt 22 does not therefore result in any movement of the indicator element 32 towards the first end-of-travel position. The indicator element 32 keeps therefore permanently the indication of correct tensioning of the belts.

The device for indicating the correct tensioning with which the buckle according to the invention is provided has therefore the advantage of ensuring that once an end-of-travel position of the indicator element is reached, this position is permanently kept. In particular, once the end-of-travel position of the indicator element corresponding to the correct tensioning of the belts is reached, this position is permanently kept even in presence of changes in the tension of the belts.

Naturally, the principle of the invention remaining unchanged, the embodiments and the constructional details may vary widely from those described and illustrated purely by way of non-limiting example, without thereby departing from the scope of the invention as defined in the appended claims.

What is claimed is:

1. A restraint system for car safety seats, comprising:
a pair of upper belts;
a lower belt having an end;
a pair of tongue-like coupling elements, each of the tongue-like coupling elements being connected to a respective one of the upper belts;
a buckle comprising:
   a case adapted to be connected to a lower belt of the restraint system;
   a coupling mechanism arranged to releasably engage the tongue-like coupling elements; and
   an indicator device to indicate to a user a correct tensioning of the belt; the indicator device comprising:
      at least one indicator element having a visual symbol adapted to be seen by the user through at least one opening provided in the case of the buckle, said indicator element being received in the case of the buckle to be movable between a first end-of-travel position, corresponding to a condition of loose belts, in which said visual symbol is not visible by the user, and a second end-of-travel position, corresponding to a condition of correctly tensioned belts, in which said visual symbol is visible by the user through said at least one opening, said indicator element being resiliently urged towards either of said first and second end-of-travel positions,
      at least one locking element received in the case of the buckle to be movable relative to the case of the buckle, said at least one locking element being connected either directly or indirectly to an end of the lower belt of the restraint system to move with said end of the lower belt relative to the case of the buckle when the lower belt is tensioned; and
      at least one spring interposed between the case of the buckle and said at least one locking element to be resiliently deformed as a result of application of a tension force on the lower belt of the restraint system, to bring about a corresponding movement of said at least one locking element;
   wherein said at least one locking element is configured to cooperate with said at least one indicator element in such a manner that when said at least one indicator element is in said second end-of-travel position once the correct tension in the lower belt is reached, the at least one indicator element is locked in the second end-of-travel position by said at least one locking element.

2. The restraint system of claim 1, wherein said at least one indicator element is rotatably mounted in the case of the buckle.

3. The restraint system of claim 1, wherein said at least one locking element is slidable in a direction of application of the tension force on the lower belt of the restraint system.

4. The restraint system of claim 3, wherein said at least one spring is arranged to apply on said at least one locking element a resilient force to pull said at least one locking element towards an inside of the case of the buckle, the resilient force being in an opposite direction to the direction of the tension force applied on the lower belt of the restraint system.

5. The restraint system of claim 1, wherein said at least one indicator element is resiliently urged towards said first end-of-travel position.

6. The restraint system of claim 5, wherein the coupling mechanism comprises a release button and wherein the release button is arranged to cooperate, in an open condition of the buckle, with said at least one indicator element to keep the at least one indicator element in said first end-of-travel position.

* * * * *